No. 883,559. PATENTED MAR. 31, 1908.
J. W. McGREGOR & L. G. FERRIS.
PULLEY CLUTCH BUSHING.
APPLICATION FILED OCT. 16, 1907.

Witnesses
L. H. Schmidt
Samuel E. Wade

Inventors
JOHN W. McGREGOR,
LEONARD G. FERRIS,
By Attorneys
Munn & Co.

UNITED STATES PATENT OFFICE.

JOHN W. McGREGOR AND LEONARD G. FERRIS, OF TACOMA, WASHINGTON.

PULLEY-CLUTCH BUSHING.

No. 883,559.

Specification of Letters Patent.   Patented March 31, 1908.

Application filed October 16, 1907.  Serial No. 397,670.

*To all whom it may concern:*

Be it known that we, JOHN W. McGREGOR and LEONARD G. FERRIS, citizens of the United States, residing at Tacoma, in the county of Pierce and State of Washington, have invented a new and useful Improvement in Pulley-Clutch Bushings, of which the following is a specification.

This invention is a clutch particularly adapted for pulleys and illustrated in the form of a bushing for split pulleys, but serviceable in connection with pulleys on wheels of various kinds mounted on a shaft.

The object of the invention is to provide a clutch which will catch in either direction and consequently cannot be placed wrong upon a shaft, and which will effectively prevent any slip between the shaft and the pulley, since a roller wedge is used which tightens as the load increases. The device also has the advantage of simplicity and few parts.

The invention is illustrated in the accompanying drawings, in which

Figure 1:
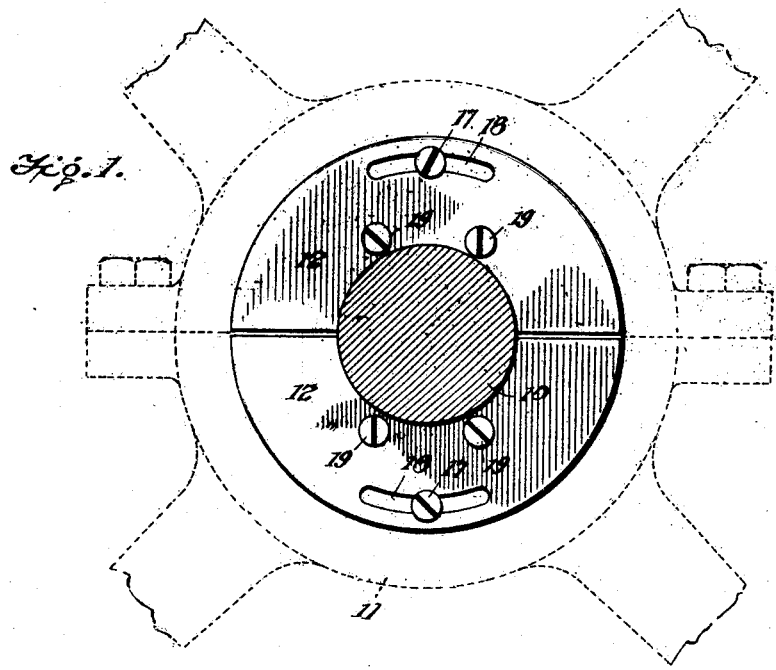
Figure 2:
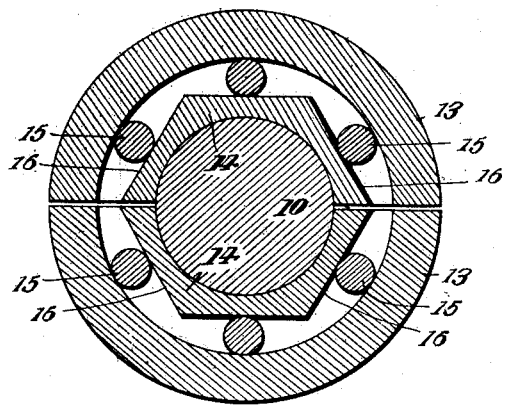

Figure 1 is a side elevation of the clutch or bushing. Fig. 2 is a section.

In the drawings, 10 indicates the shaft on which the bushing is mounted, and 11 is the hub of the pulley or wheel in the eye of which the bushing is placed.

The bushing is split or formed in two parts, having semi-circular end pieces 12, semi-circular outside pieces 13, and semi-circular inside pieces 14. The end and outer pieces form a split casing which contains the inside pieces and the rollers 15 which fit between the inside and outside pieces, and cause the clutching action by their pressure therebetween, tending to expand the outside pieces in the eye of the pulley and to contact the inside pieces upon the shaft.

The inner and outer surfaces of the outside pieces are cylindrical in form, and so are the inside surfaces of the inner pieces, where they bear against the shaft. The outer surfaces of the inside pieces are polygonal, as shown at 16, and are hexagonal as illustrated. The rollers or cylinders are placed between the flat surfaces 16 and the inner surfaces of the outside ring sections, and the diameter of the rollers is substantially equal to the greatest distance between the inner and outer ring surfaces.

The sections 13 of the outer ring are connected to the end pieces 12 by means of screws 17 extending loosely through slots 18 in the end pieces, and the sections 14 of the inner ring are fixed to the end pieces by screws 19, although this arrangement may be reversed if desired. It will be evident that the connection is such that the rings may be moved relatively either radially or rotatably, the slots 18 being made wide enough so that the rings may be moved slightly relatively in a radial direction.

In operation, when the pulley on the shaft is started in either direction the friction turns the rings relatively to each other, to a slight degree, causing the rollers to travel up the inclines formed by the plane surfaces 16. This expands the bushing, pressing the outer ring sections against the pulley hub and the inner ring sections against the shaft, and the pressure increases with the strain, thereby forming the clutch. As shown the parts are symmetrical and will therefore clutch either way, and it is the same whether the shaft on the pulley is the driver or not. When nicely fitted there is very little back slip in starting or stopping.

We claim—

1. A clutch bushing comprising split outer and inner rings with opposite surfaces inclined toward each other, and rollers located between the rings and bearing upon said surfaces.

2. The combination with a shaft and pulley, of a clutch bushing in the eye of the pulley, comprising inner and outer split rings bearing against the shaft and pulley hub respectively, said rings being spaced apart with surfaces inclined toward each other, and rollers in said space, between said surfaces.

3. A clutch bushing comprising an outer ring, an inner split ring spaced therefrom, the outer surface of the inner ring having faces inclined toward said outer ring, and rollers between said faces and the outer ring.

4. A clutch bushing comprising split outer and inner rings spaced apart, the surface of one ring having the form of a regular polygon, and rollers between the respective faces thereof and the opposite surface of the other ring.

5. A clutch bushing comprising split outer and inner rings, semi-circular end pieces secured to one of said rings and having a loose connection with the other, allowing them to expand or contract, said rings having opposite surfaces inclined toward each other, and rollers located between the end pieces and bearing between said surfaces.

JOHN W. McGREGOR.
LEONARD G. FERRIS.

Witnesses:
H. F. NORRIS,
C. L. MOORE.